United States Patent Office 3,549,503
Patented Dec. 22, 1970

3,549,503
PROCESS AND APPARATUS FOR THE DISTILLATION OF DISTILLAND DISPLACED BY DISTILLATE
Harold R. Hay, Phoenix, Ariz.
(795 Roble, Menlo Park, Calif. 94025)
Continuation-in-part of application Ser. No. 490,791, Sept. 28, 1965. This application Oct. 9, 1968, Ser. No. 772,452
Int. Cl. B01d 1/00; C02b 1/06
U.S. Cl. 203—11    18 Claims

ABSTRACT OF THE DISCLOSURE

Condensate collected in receivers having a displaceable rigid or flexible wall causes displacement of distilland into a distillation zone, thereby the distilland feed rate is made proportional to the production of distillate distilled by a varying heat input. A fluid or a thermal barrier affecting thermal transfer may be interposed between the distillate and the distilland in a common vessel without interfering with the displacement of distilland by collected distillate fractions.

This application is a continuation-in-part of my prior application, Ser. No. 490,791 filed Sept. 28, 1965 (now abandoned).

This invention relates to a process and apparatus for distillation of liquids in which novel means incorporated into the distillation process feeds distilland into a distillation process distillation zone at a rate approximately proportional to the rate of distillate production by a variable input of heat into the distillation zone.

It is one object of this invention to provide an improved process and apparatus for distillation of liquids. Other objects are: to control the feed rate of liquid distilland so that it is approximately proportional to the rate of condensate production; to cause distillate collected in a non-flexible container to displace distilland into a distillation zone; to collect various fractions of a distillate in a receiver having a plurality of compartments with flexible walls and to cause displacement of distilland into a distillation zone by the accumulation of distilland in the various compartments; to interpose one or more fluids other than distillate between distillate in a vessel and distilland also within the vessel from which the distilland is to be displaced into a distillation zone; and, to preheat distilland to be displaced into a distillation zone by distillate.

This invention also relates to a process and apparatus for solar distillation. By means of a plurality of condensate collectors contacting the still cover and preferably forming the cover into a multi-planar shape, condensate collected at apexes of multiplanarity overlying distilland in a multi-sectional still displaces distilland at a lower level thereby causing the rate of addition of distilland to equal the rate of production of condensate thereby preventing over-feeding or underfeeding of the saline water to the still.

Objects of this solar still embodiment are to provide an improved device of low cost for the distillation of liquids by use of solar energy; and to provide a simple means for controlling the rate of feeding saline water into a solar still.

Other objects and advantages of the present invention will become more apparent after reading the following disclosure taken in conjunction with the drawings. It is understood that the drawings are for the purposes of illustration only, and are not to be construed as a definition of the limits of the invention, reference being made to the appended claims for that purpose.

In my prior application Ser. No. 490,791, filed Sept. 28, 1965, of which this is a continuation-in-part, a distillation process is described in which distilland is distilled, the distillate is collected in a distillate receiver adjacent a distilland reservoir and separated therefrom by a flexible impervious membrane which is displaced by collected distillate and displaces distilland into a distillation zone. The process and apparatus embodiments previously disclosed were primarily applied to solar distillation producing a single distillate in a simple distillation. The present invention involves additional processes as well as apparatus embodiments in which various types of distillate receivers are employed, in which a plurality of distillate fractions act conjointly to displace distilland into a distillation zone, and in which a fluid is interposed between the distillate and the distilland to affect thermal exchange between them.

It is the purpose of both my prior application and of my present application to cause collected distillate to feed distilland into a distillation zone at a rate approximately proportional to the distillation of distilland from said distillation zone. This rate varies with the amount of heat input vaporizing the distillate. Heat input may vary with the solar radiation intensity or with the amount and disposition of a fuel heating the distillation vessel, with the amount of oxygen available for the fuel, with the pressure on a gaseous fuel supply, with the voltage of an electrical heat source, or with other influencing factors. Variation of heat input greatly complicated feeding distilland to a still prior to my inventions. Constant-level devices are not readily applied to a boiling liquid, electric-eye and magnetic level-determining devices are also affected; and sight gages or orifices may become plugged or broken. In general, distillation required continuous attention by an operator adjusting a manual feed or a pumping device. Failure of the operator to attend to his duty or failure of the pump or other metering devices could have the serious consequence of feed stoppage and a dry still. Flooding of the still would occur if the heat input decreased or if distilland input increased.

With many distillands, the time during which the distilland is held at vaporization temperature should be minimized to reduce thermal decomposition. Various expensive means devised to rapidly vaporize liquids are in widespread use. The present invention provides a very low-cost means for minimizing the volume of distilland in the distillation zone without risk of flooding the still or of having it go dry. Thus, a smaller still can now be used and initial equipment costs for distillation can be reduced.

APPLICATION TO SOLAR STILLS

Single-stage solar stills have been of different types each having characteristic advantages and disadvantages. The basin still is aerodynamically stable but owing to the horizontal disposition of the saline water in the basin, the angle of incidence of solar radiation is not the most favorable and the yield from the still is low (30 to 40%). The tilted still uses a wick wetted with saline water and positioned approximately perpendicular to the solar rays; this, together with a shorter distance from the evaporative surface to the condensing cover, results in a higher efficiency (50 to 60%).

Despite frequent redesigning, tilted stills of prior art could not be fed with saline water (distilland) in a proper and convenient manner. Too fast a feed rate provided an excess of distilland which carried away heat usable for distillation. Too slow a feed rate produced dry spots and deposited reflective white salts not easily flushed away. Thus either overfeeding or underfeeding lowered production.

The optimum feed rate is that amount of water which is removed from the still as distillate plus enough excess to remove salts left by the distillate. Owing to changing solar intensity during the day, the feed rate should be varied. An attempt to use a capillary tube which feeds cold water of higher viscosity at a slower rate in early morning and late afternoon but which feeds warm water of lower viscosity at a higher rate at midday, did not provide those practicing prior art with the desired control; plugging of the capillaries necessitated a filtered feed water supply. Other methods for controlling the feed rate have hitherto proved uneconomic, required proportioning pumps, metering devices, etc., and were difficult to maintain. In the simple means of this invention, the disadvantages of prior solar still designs are overcome and the still operates automatically at near optimum efficiency during periods of changing solar radiation intensity.

To obtain aerodynamic stability, I may mount my still on a stable base erected for other uses. I prefer a house or farm structure and place the still on the roof and/or side wall facing the equator. The roof may be flat or pitched and made up of corrugated sheets convenient for fastening down the edges of the still by passing the cover and bottom liner under overlapping sheets bolted down in the usual manner. I thereby eliminate costly supporting and sealing means of prior art and confine materials costs to productive components. The still design of this invention may also be laid out on a hillside, dike, sea wall or beach to which it may be fastened by stakes or other means and have edges sealed by conventional means. My invention may likewise be used with prior type stills mounted as self-standing units.

What I now disclose represents a workable embodiment of my invention.

Figure 1:
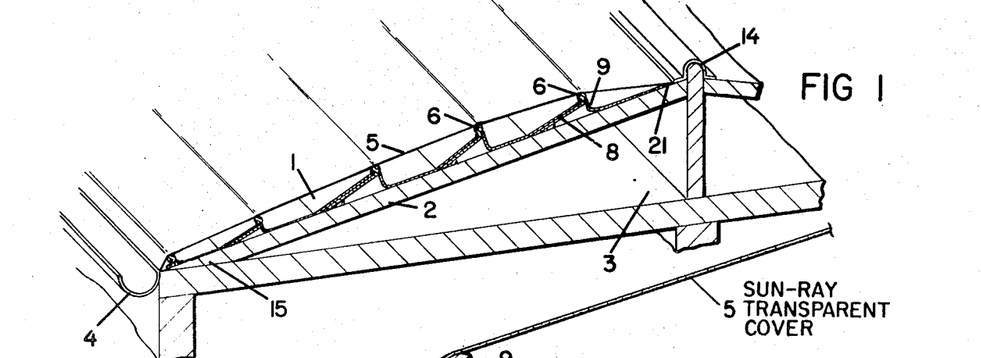
FIG. 1 shows a cross-sectional view of a portion of a house having a sloping roof which supports a solar still representing an embodiment of this invention.

In FIG. 1, my still 1 rests on the southerly side of a roof 2 on a building 3 fitted with a gutter 4 to collect rain, The still 1 consists of a cover 5 made multiplanar by a plurality of cover supports 6 and, more clearly shown in FIGS. 2 and 3, a bottom liner 7, a black porous wick 8, a condensate collector 9, a reservoir 10 for distilland (saline water) 11, a reservoir 12 for condensed distillate (potable water) 13, and other parts subsequently to be described. The still 1 is fastened by suitable clamping means commonly used in building structures such as the ridge roll 14, the eave closure 15, barge boards or fascia (not shown), or overlapping joints of rigid roof sheeting materials, after extending the cover 5 and bottom liner 7 somewhat beyond the ends of cover supports 6 and other components within said still.

The use of a plurality of cover supports 6 contributes to wind stability of still 1, minimizes cover contact with the wick 8 (which would cause loss of condensate to said wick and would transfer saline water 11 to said cover and to collecting trough 9), and reduces drainage distance along said cover thereby reducing the time for re-evaporation of condensate 13 transported by said cover to said collecting troughs.

The multi-planarity produced in cover 5 by cover supports 6 need not be great—one or two degrees or less is workable as long as said cover is caused to rest upon said supports and to transfer condensate thereto. The top of support 6 is preferably but not necessarily rounded to an arc with one-half inch radius to reduce friction and abrasion as the draped cover 5 shifts position under variable wind loads. By not fastening cover 5 at each cover support 6, fewer stress points are created at which plastic embrittlement and tearing of said cover can occur.

The method of operating my still follows. In the early morning, the condensate of the previous day, collected in condensate reserovir 12, is drained through conduit 16 in the wall thereof and through tubing 17 which interconnects condensate collecting trough 9 with said fitting 16 in condensate reservoir 12 and which conducts condensate 13 to a lower level in the building structure as shown in FIG. 5 where the tubing is fitted with a valve or clamping means (not shown). After draining condensate, the envelope forming condensate reservoir 12, made by sealing a plastic film 18 to the bottom liner 7, which constitutes a wall of distilland reservoir 10, at point 19 and spot welding it to said bottom liner at point 20, is collapsed as shown in FIG. 2.

Figure 2:
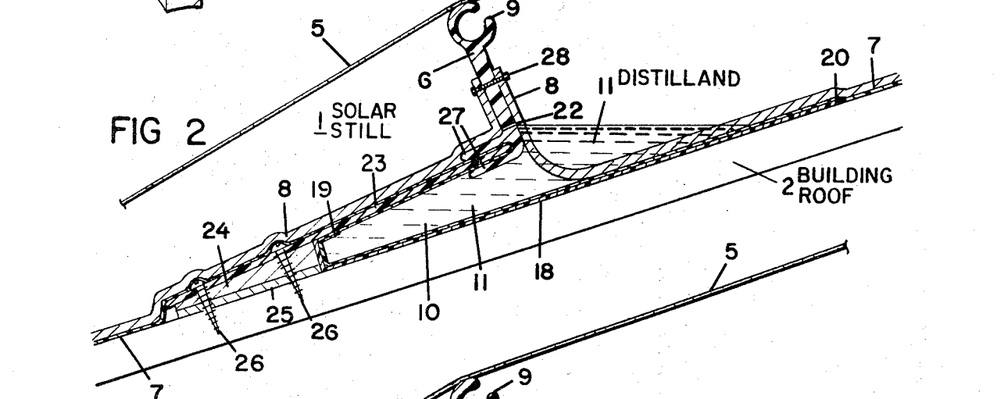
FIG. 2 illustrates a cross-sectional view of a portion of the solar still showing means for feeding saline water thereto prior to starting distillation and means for varying the angle of the cover support of the still and means for forming the still cover into a multi-planar shape.
Figures 3, 4, 5:
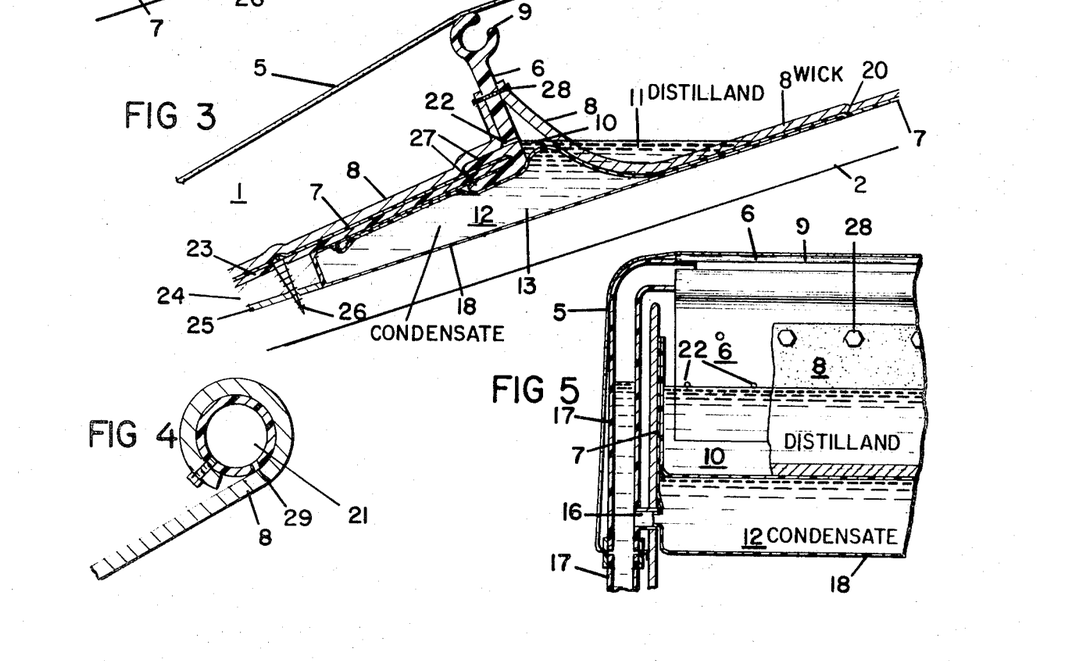
FIG. 3 shows the same portion as in FIG. 2 near the end of a distillation period.
FIG. 4 shows means for feeding saline water at the upper extremity of the solar still.
FIG. 5 illustrates means for conducting distillate to and from the condensate reservoir.

Distilland 11 is then fed into the still through a perforated feed tube 21 located at the top of the still and wrapped around by the wick 8 as shown in FIG. 4. Means for feeding a constant flow of said distilland are well known in the art and need not be described in detail but may comprise a storage tank (not shown) located under the ridge roll 14 and providing a constant head pressure of distilland 11 feeding into perforated feed tube 21. Because distillation does not start until slightly later in the day, the distilland 11 flows downward over bottom liner 7 and through wick 8 to a cover support area such as is shown in FIGS. 2 and 3 where it collects in distilland reservoir 10. When reservoir 10 is filled, the distilland 11 forms a pool which overflows through passageways 22 in cover support 6 onto the bottom liner 7 and wick 8 of the next lower section of still 1. In this manner the wick 8 is thoroughly wetted and the distilland reservoirs are filled in each section of the still. The bottom section of the still may end with a collecting area such as is shown in FIG. 2 except that brine which drains through passageways 22 may flow directly into gutter 4. Other methods used in prior art for feeding distilland into the upper end of a still and for removing condensate and brine from the lower end may be used, and need not be described, since they do not directly involve my invention.

The preferred amount of distilland 11 permitted to enter the still through perforated feed tube 21 is that amount which may be expected to evaporate during the day in the topmost section plus an adequate excess to carry away in the waste brine at the lower end of the still all salts left behind by the distillation taking place in the entire still 1. The condensate expected will vary according to the size of the still, the intensity of solar radiation at the particular latitude and time of year, and the orientation of the evaporation surface. As distillation occurs, water vapors leaving wick 8 condense on cover 5, collect in collecting trough 9, pass through tubing 17 and conduit 16 into condensate reservoir 12 all as best shown in FIG. 5. The condensate 13 under a higher head pressure than the distilland 11 in distilland reservoir 10, expands the flexible wall of condensate reservoir 12 thereby displacing distilland 11 from its reservoir 10 and causing it to overflow through passageways 22 in cover support 6 and to flow downward in the next lower section of the still 1 along with the excess of distilland 11 fed into the topmost section of said still. In this manner, each section of the still 1 below the topmost section is automatically fed with distilland 11 in exact amount equal to that evaporated in the next higher section regardless of any fluctuations in solar radiation intensity during the day.

The distillation process proceeds during the day and the collection of condensate 13 in condensate reservoir 12 continues until, near evening, the condition shown in FIG. 3 prevails. During the day condensate 13 in the condensate collection reservoir 12 is heated nearly to the temperature of distilling distilland but does not distill since it is confined within the impermeable walls of condensate reservoir 12. The warm or hot distillate 13 can, if desired, be drawn out of condensate reservoir 12 for use provided the excess distilland 11 fed into the topmost section of the still again fills the distilland reservoir 10 before the wick 8 in the next lower section of the still dries out. During the nighttime, the condensate 13 in condensate reservoir 12 first contributes its heat to the distillation process then cools to the night sky so that it is refreshingly cold when drawn off in the early morning and may be stored in this condition in an insulated container for use.

Having described the method of operating my still, its construction will now be further detailed. The length of the still 1 may be considered as the distance from the ridge roll 14 of FIG. 1 to the eave and gutter 4 sections of the roof 2. The width of the still 1 may be from one side of the roof to the other though said still need not cover the whole of the roof. The cover 5, cover supports 6, base liner 7, wick 8, distilland feed tube 21, reservoirs 10 and 12, and the bottom collector for condensate and brine (not shown) usually extend across the full width of the still. Perforations in the feed tube 21 and the passageways 22 in cover support 6 are spaced across the width of said still in a manner to assure uniform wetting of wick 8 across its full width. The connecting tubing 17 and conduit 16 may exist at only one edge of the still, as shown in FIG. 5, but are required separately for each section of the still. In some cases, where roof slope or other conditions provide inadequate head pressure between the condensate collecting trough 9 and the immediately underlying condensate reservoir 12, the interconnection may be made from the collecting trough 9 to the condensate reservoir 12 of a lower section of the still 1.

To provide, in this embodiment, rigid walls partially confining reservoirs 10 and 12 and to provide means for fastening cover support 6, a locking sheet 23, a wedge member 24, and a spacing shim 25 extending across the width of the still are secured to the roof 2 by screws 26. The cover support 6 is made with projecting legs 27 which clamp onto the upper edge of locking sheet 23 having adequate distance between the two projecting legs 27 not only to admit locking sheet 23 but also to admit two thicknesses of the bottom liner 7 so as to form a watertight seal around the upper edge of locking sheet 23. The wedge 24 and shim 25 close the space between the roof 2 and the locking sheet 23 at the lower end of said locking sheet thus confining movement of outer walls of reservoirs 10 and 12 except at their upper extremities. The use of one or more shims 25 permits the height of the cover support 6 to be varied so as to produce the preferred angular shape of cover 5. The wedge 24 may be varied in thickness at its upper and lower edges so as to cause the locking sheet 23 to vary its angle to the horizon and this angle in turn varies the angle of the stem of cover support 6 with respect to solar incidence. By substituting wedges with different angles the stem of cover support 6 can be altered and positioned approximately parallel to the solar radiation and in this manner cast less shadow upon the still 1 and interfere least with maximum operating efficiency.

Instead of wedge 24 of FIG. 2, or just above it, I may secure a metal or rigid plastic shaft which is at least in part eccentric within still 1 and which extends through a lateral wall thereof where it is fitted with a handle or other means for turning the shaft. A partial rotation of the shaft then causes its eccentric portion to contact and to flex the locking sheet 23 which may be made of semi-rigid plastic secured to roof 2 at a point closer to the still bottom than the position of the eccentric. Flexing the locking sheet 23 in this manner not only alters its angle with respect to the still bottom but also the angle of the stem of cover support 6. Thus it is a means for periodically causing the stem of cover support 6 to be made parallel to the varying incidence of solar radiation.

The materials from which various components of the still 1 are made may be selected from among those well known in the art and are not limited to those now mentioned. Cover 5 may be 4 mil film of polyvinylfluoride (Tedlar), polychlorotrifluoroethylene (Aclar), polyglycolterephthalate (Mylar) or of vinyl or polyethylene resins treated to resist actinic deterioration. Cover support 6 should be of extruded methacrylate resin, of some other suitable plastic, or of aluminum resistant to salt corrosion. Basin liner 7 and film 18 forming a portion of condensate reservoir 12 may be of 4 mil polyethylene or polypropylene. It may also be an asphalt impregnated felt with or without granules and of varying degrees of flexibility. Wick 8 may be of polypropylene or polyacrylonitrile fibers integrally made black with carbon and formed into a loose woven or preferably, non-woven fabric one-fourth inch thick or less. Said wick may be cemented to the bottom liner 7 by a proper adhesive or it may be clamped at the upper and lower ends by bolts in the manner shown at 28. The wick function of distributing the distilland across the still may be performed by other materials such as an asphalt impregnated sheet with mineral granules on the upper surface or by a fiber glass screen or other distilland distributing means. The tubing 17 and conduit 16 may be of polyvinyl chloride or of butyl rubber as may the feed tube 21.

The locking sheet 23 and shims 25 may be of asbestos cement, of plywood, or of semi-rigid plastic and should have edges rounded to protect the plastic films in contact with it. The wedge 24 may be of wood. Screws passing through the locking piece 23, wedge 24, shim 25, and fastening into the wood roof 2 need not be other than steel but bolts at wick-clamping point 28 should be corrosion resistant. Care must be taken at the upper end of the still and at the sides to prevent rain from entering between the bottom liner 7 and the roof 2.

My invention is not limited to the embodiment illustrated in FIGS. 1, 2, and 3. My invention would operate with equal efficiency if a condensate collector suspended across the width of the still contacted and/or supported the cover without direct interconnection to those components of my invention underlying the collection trough except through the tubing 17 which drains condensate to condensate reservoirs.

Figure 7:
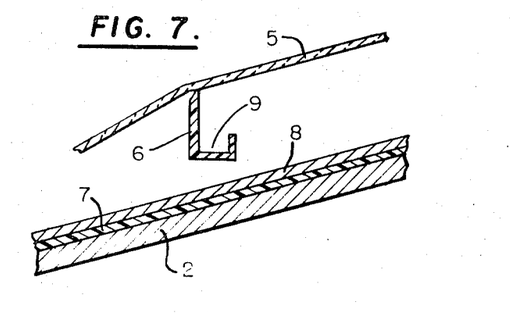
FIG. 7 illustrates an additional means for forming the cover into a multiplanar shape and for collecting condensate at the apexes of multiplanarity.

In FIG. 7 the embodiment has a flexible plastic cover 5 made multi-planar by cover support 6 which is supported only at the lateral extremities of the still (not shown) and is, in effect, a beam-type support crossing over the distilland distillation zone shown as wick 8 at any location in still 1 of FIG. 1. The cover-supporting edge of cover support 6 is shown as a moderately sharp edge which causes the cover 5 to form two planes over the distilland distillation zone 8 and which causes condensate on the portion of the cover higher than the contacting edge of support 6 to drain into condensate collecting trough 9 associated with cover support 6. The condensate collecting trough 9 is fitted with appropriate means (not shown but which may be a plastic or rubber connector) which conducts condensate to a distillate reservoir (not shown) which may be of the type of 12 of FIGS. 2, 3 and 5 at any location in the still or outside thereof at a level lower than the level of the independent collection trough 9 of FIG. 7. Thus the relationship with a distillate reservoir is immaterial and the shape of cover support 6 and associated collecting trough 9 may be varied so long as they perform the functions described and cause condensate to be removed at apexes of multiplanarity located over a distilland distillation zone. The collecting trough 9 need not be fastened to or a part of cover support 6 but may be separately suspended across the still and over the distillation zone and disposed to receive condensate dripping down from cover supporting member 6 made of a purely vertical member such as that portion contacting the cover 5.

Figure 6:
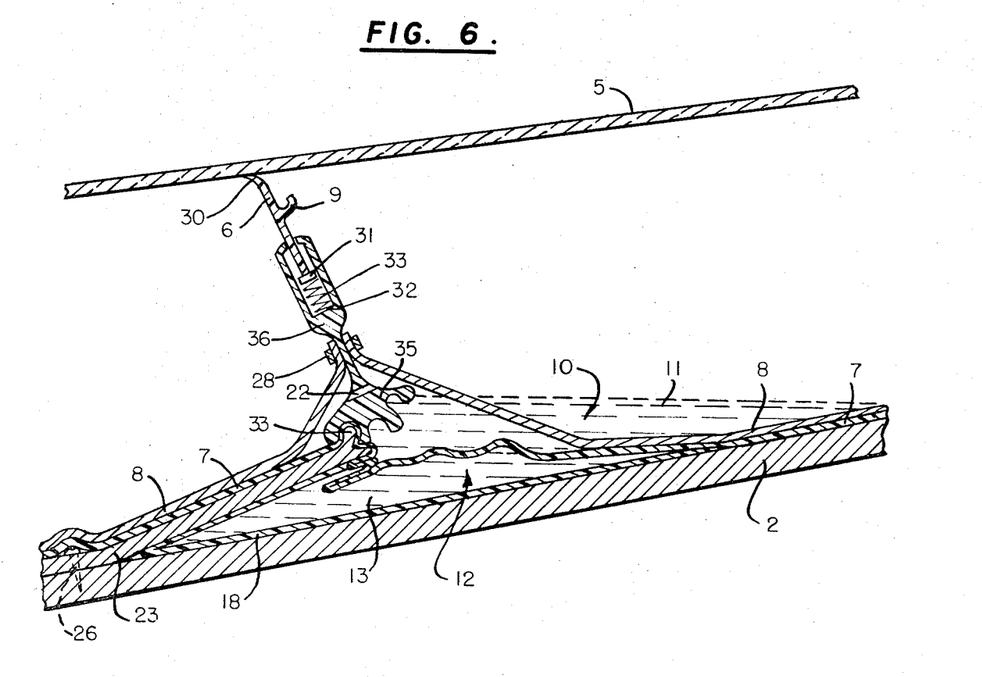
FIG. 6 shows an additional means for varying the angle of the cover support for the solar still.

FIG. 6 is an embodiment of my invention in which condensate is collected from a sloping glass cover 5 on a solar still shown in fragmentary section and of design similar to that illustrated in FIGS. 1 to 5. Glass cover 5 may be primarily supported at its perimeter and partially supported or contacted by elongated member 6 which may be of a semi-rigid material such as rubber or plastic feathered at its upper extremity and bent over at 30 by the weight of the glass cover 5 or by the pressure of a spring 33. The elongated horizontal collecting trough 9 shown as a part of cover-contacting member 6, may in other embodiments be separate from member 6 but capable of receiving condensate removed thereby from cover 5. In the embodiment of FIG. 6, condensate collecting trough 9 is connected, by suitable means (not shown), with a condensate reservoir 12. Parts 2, 7, 8, 10, 11, 12, 13, 18, 22, 26, and 28 of FIG. 6 are identical to parts correspondingly numbered in FIGS. 1 to 5 and serve the same functions.

The cover support 6 is shown terminating at its lower extremity in a pressure plate 31 confined in a chamber 32 which also confines one or more spring members which exert pressure on pressure plate 31 and cause member 6 to contact sloping cover 5 with adequate pressure to remove condensate therefrom but without causing multi-planarity of cover 5.

The embodiment of FIG. 6 also shows another means for varying the angle of the cover-supporting or cover-contacting member 6 to align it parallel to the solar radiation. In this embodiment a rigid plastic locking sheet 23 is bent and fastened to roof 2 by screw 26. The upper extremity of locking sheet 23 is formed with a keying protuberance 34 capable of locking into any of several recesses formed in arcuate portion 35 at the lower extremity of assembly 36 which includes chamber 32, spring 33, and cover contacting member 6 with associated pressure plate 31 and collection trough 9. By engaging the protuberance 34 on locking sheet 23 in different recesses of arcuate portion 35 of assembly 36 the angle which cover-contacting member 6 and which assembly 36 take in relation to the incidence of solar radiation may be varied so as to minimize their shading effect on the distilland distillation zone. Cover-contacting assembly 36 is preferably made in most parts of plastic extrusions; spring 33 may be of bronze or other non-corroding spring material coiled or bent in a manner to act as a spring.

EMBODIMENTS NOT INVOLVING SOLAR DISTILLATION

Figure 8:
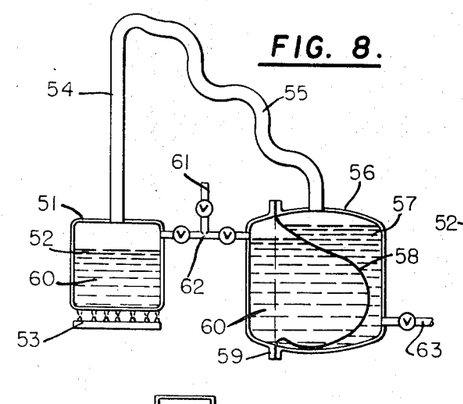
FIG. 8 is a cross-sectional representation of an apparatus in which distillate received on one side of a flexible membrane displaces distilland into a distillation zone.

In another embodiment, my invention is applied to a conventional distillation process in which heat not derived from solar energy causes distillation. In FIG. 8, distillation vessel 51 encloses a distillation zone 52 containing distilland 60 heated and vaporized by a heat source 53 shown as a gas burner. Vapors rising in still column 54 pass into condenser 55 from which condensate drains by gravity into a distillate receiver 56 having, as a part thereof, a flexible wall 58 adjacent to distilland 60 capable of being displaced into the distillation zone 52 within still 51.

The embodiment of FIG. 8 shows distillate 57 and distilland 60 within vessel 56 which consists of two metal parts, each part having flanges 59 and fastening bolts (not shown) which permit the uniting of the two portions of vessel 56 and which clamp flexible membrane 58 in a manner compartmentalizing vessel 56. Distillate 57 is shown in one compartment at a higher level than the distilland 60 in the other compartment and the resulting head difference creates a force which displaces flexible membrane 58 and causes a portion of distilland 60 to flow through feed line assembly 62 into distillation zone 52. Feed line assembly 62 is shown provided with valves and an inlet 61. When distillate 57 is withdrawn from vessel 56 through outlet 63, distilland 60 can be introduced into vessel 56 through inlet 61 and feed line assembly 62, which can also be used to fill still 51 to a proper level to begin distillation by obvious manipulation of the valves indicated as a part of feed line assembly 62.

It is sometimes difficult to find a flexible material adequately resistant to the solvent or deteriorating action of some distillands and distillates. Also it may be desirable to raise the distilland temperature prior to displacing it into the distillation zone and this elevated temperature may be damaging to rubber, plastic, or other flexible membranes. For such circumstances, the present invention provides the embodiment shown in FIG. 9 wherein the heater 53, still 51, column 54, and condenser 55 may be of any type and of glass, metal or other material conventionally used in the art and do not constitute a part of my invention, which is primarily related to the distillate receiving vessel 56 and the distilland reservoir 65. Distillate 57 is shown as being received from condenser 55 in an open, rigid wall receiving vessel 56, though a closed vessel may be substituted for highly volatile distillates. Receiving vessel 56 is shown nesting within distilland reservoir 65 and floating upon distilland 60 therein.

Figure 9:
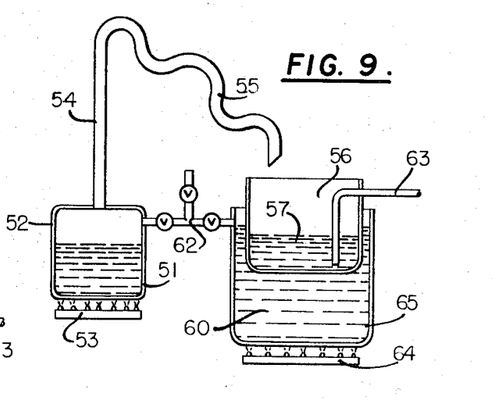
FIG. 9 is a cross-sectional representation of a distillation apparatus in which distilland collected in a receiver with non-flexible walls displaces distilland into a distillation zone.

Both the distillate receiver 56 and distilland reservoir 65 of FIG. 9 may be made of glass, metal or of any other suitable material formed into a convenient shape and capable of confining adequate volumes of distilland and distillate. The weight of the distillate receiver 56 and of the distillate therein, tend to displace distilland 60 through feed line assembly 62 which connects distilland reservoir 65 and distillation vessel 51. Distillate 57 may be removed from its receiver 56 through outlet 63, consisting of a metal pipe connected to a pump, a siphon, or other removal means not shown. Distilland 60 may be introduced into distilland reservoir 65 and still 51 through inlet 61 by proper manipulation of valves of feed line assembly 62, or, it may be introduced through the space between nesting vessels 56 and 65, to cause vessel 56 to float on the distilland in reservoir 65. A preheater 64 can be used to raise the distilland temperature near the boiling point of distillate 57, if desired.

In operation, collection of distillate 57 in vessel 56 of FIG. 9 causes displacement of distilland 60 from vessel 65, even though the height of the distillate 57 may be lower than the height of the distilland 60 owing to the displacing action of the weight of vessel 56. Addition of distillate 57 causes a downward positional displacement of rigid-walled vessel 56, resting within distilland reservoir 65 and floating on the distilland therein. The downward positional displacement of vessel 56 with relation to vessel 65 displaces distilland 60 upwardly until it rises to the level of the outlet feed line assembly 62 whereupon it may flow by gravity through feed line assembly 62 into distillation zone 52, or it may rise above the outlet level shown in FIG. 9, if feed line assembly 62 slopes upward before discharging into distillation zone 52 or even into distilling column 54 provided, in all cases, that the height of the walls of vessel 65 is greater than the level of the feed line assembly 62 at its point of discharge into the still 51 or column 54.

A plurality of rigid-wall distillate receivers, of the type shown as 56 in FIG. 9, can be nested within one another in vertical relationship to one another and to the distilland reservoir 65, each floating on a liquid in the underlying larger receiver or vessel and each fitted to receive a distillate fraction causing the rigid wall to vary its positional relationship with the rigid walls of the other distillate receivers and of the distilland reservoir. Moreover, it is evident that a liquid other than distillate may be interposed between a distillate receiver 56 and the distilland reservoir 65 in a vessel similar to distillate receiver 56 where it may serve various purposes, such as preheating distilland 60 in its reservoir 65 rather than heating it with preheater 64. A thermal barrier of rigid, semi-rigid or other nature may be interposed between the distilland 60 and the overlying vessels containing distillate so that heat added to distilland 60 by means of preheater 64 is not transferred in substantial amount to distillate. The use of a plurality of rigid-wall distillate receivers and of an interposed fluid or thermal barrier will be clarified further in relation to FIGS. 11 and 12 in which flexible-wall compartments are shown in lateral relationship acting as a plurality of distillate receivers.

Figure 10:
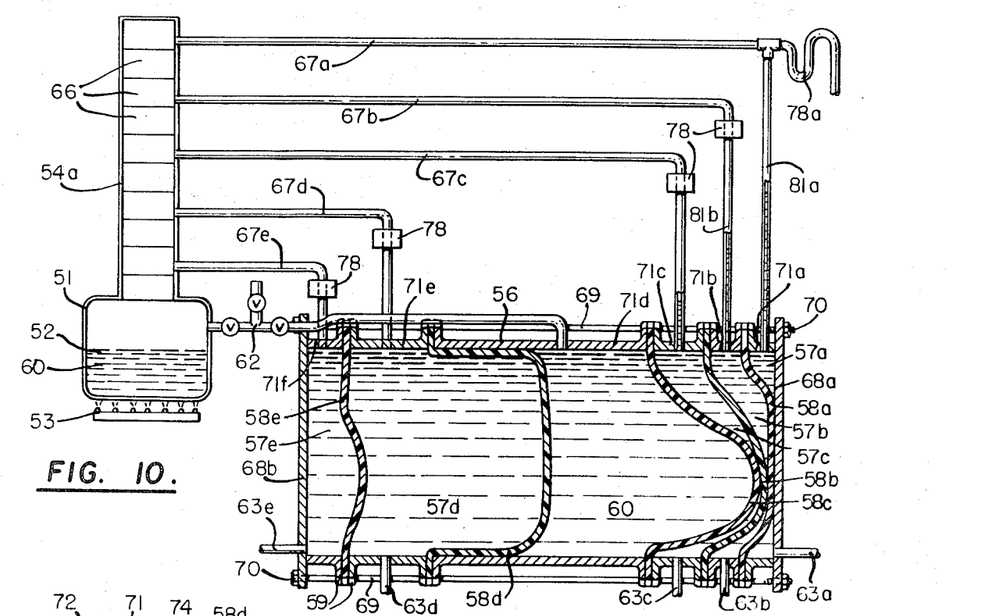
FIG. 10 is a cross-sectional representation of a distillation apparatus in which distillate received in a plurality of compartments having flexible walls acts to displace distilland into a distillation zone.

In the embodiment of my invention shown in FIG. 10, distillation vessel 51 containing distilland 60 in a distillation zone 52 is heated by heater 53 and is connected to a fractionating column or a fractionating tower 54a comprising a plurality of plates 66 at different levels from which different boiling point fractions of distillate can be withdrawn, all in a manner well known in the art, and not constituting a part of this invention. The distillate fractions are shown as being withdrawn from fractionating tower 54a through sloping pipes discharging into vessel 56 which also encloses distilland 60 which can be forced through feed line assembly 62 to distillation zone 52. Vessel 56 is shown compartmentalized to receive several fractions of distillate in various volumes. Each compartment is partially bounded by at least one flexible membrane which is displaceable by liquid within that compartment and by liquid within an adjacent compartment.

Fraction 57a is shown as a low-density fraction, removed from the top plate of fractionating column 54a through condensate line 67a, entering the compartment defined by end plate 68a of vessel 56 and flexible membrane 58a. As shown, the level 81a of the low-density fraction 57a in condensate line 67a is high in order to displace flexible wall 58a against pressure created by higher-density fraction 57b which is removed from tower 54a through condensate line 67b and rises to level 81b when confined in receiver 56 between two flexible membranes 58a and 58b. Similarly, fraction 57c received through line 67c is partially confined between flexible membranes 58b and 58c; fractions 57d received through line 67d is partially confined between flexible membranes 58d and 58e, and fraction 57e received through line 67e is partially confined between flexible membrane 58e and end plate 68b of vessel 56. Each condensate line enters a compartment of vessel 56 and each compartment is shown as having an outlet assembly 63a, 63b, 63c, 63d and 63e consisting of a pipe and a valve (not shown) through which distillate may be withdrawn.

Distilland 60 is shown in a central compartment of vessel 56 and confined by flexible membranes 58c and 58d though it might be placed with equal effectiveness anywhere within vessel 56. The disposition of distillate in the various compartments illustrates that flexible membranes 58c and 58d are capable of lateral displacement permitting distilland to essentially fill vessel 56, a normal condition at the start of a distillation. At the end of a distillation during which essentially all distilland has been displaced from vessel 56, membranes 58c and 58d might be contacting each other over much of their surfaces. FIG. 10 also intentionally distorts the normal position of flexible membrane 58d to illustrate measures taken if the volume of fraction of distillate 57d exceeds the capacity of its receiver—that is exceeds the limit of extensibility of flexible membrane 58d. Such a condition exerts pressure on flexible membrane 58e and distillate 57e causing distillate to rise in the vertical portions of condensate lines 67e and 67d. At an appropriate level, an electric eye 78 or other sensing device could detect the rise of distillate and actuate an alarm before distillate reached a height in the condensate lines causing it to remain in the fractionating tower 54a. Alternatively, a goose-neck overflow assembly such as indicated by 78a can be employed to remove distillate through connections (not shown) to an emergency receiver.

As an alternative for handling an excess of a fraction such as 57d, a spare compartment can be provided in vessel 56 to accept distillate from any or all of the condensate lines after it has reached a certain level. Thus, overflow from goose neck assembly 78a might flow back into the spare compartment in vessel 56. Also two compartments of vessel 56 might be interconnected or receive a divided stream of a distillate fraction. All compartments of vessel 56, except that containing distilland, can be intended for a single distillate when the material being distilled does not yield different fractions.

To form a plurality of compartments with flexible membranes in vessel 56 of FIG. 10 it is convenient to utilize the frame of a filter press or of a plate heat exchanger. Vessel 56 is shown as having two metal end plates 68a and 68b and flanged metal spacers 71a, 71b, 71c, 71d, 71e and 71f. The end plates and spacers may be rectangular or circular and the flanges 59 may be replaced by tongue and groove engaging elements or other means which assist in aligning the spacers and the end plates and which grip the flexible membranes in a manner producing a liquid seal when a plurality of threaded metal tie rods 69 with metal nuts 70 are used to exert force on end plates 68a and 68b through which the tie rods pass, or when other means are employed to produce adequate seals.

With some distillands and distillates, especially when small volumes are involved, it is adequate to place a relatively thin rubber sheet between spacers of vessel 56 and to rely upon the stretch of the rubber to provide a compartment of the volume required by the collected distillate. A film, or membrane having an area several times that of the cross-section of the compartment to be formed in vessel 56 can be inserted in the vessel and clamped therein. The loose portion of the film inside vessel 56 acts as a diaphragm displaceable by small pressure differentials on its opposite sides. This method, however, may necessitate putting folds in the film material in the portion shown sealed by the clamping spacers. Some membrane materials are sufficiently plastic to yield under pressures, such as can be applied by the rods 69, and thus produce a liquid-tight seal in spite of such folds. With other membranes, compressible gaskets may be used to form a seal. Most satisfactory is a molded diaphragm preformed with a relatively thick, flat-flanged area corresponding to the flanges of the spacers clamping the diaphragm and preformed with a thinner dished center. Such diaphragms are readily available and their forms and methods of manufacture are well known. The diaphragms, or flexible membranes, may be made by thermoforming a variety of plastics or by casting elastomers, such as polyethylenes, vinyls, polyamides, fluorocarbons, etc.

Figure 11:
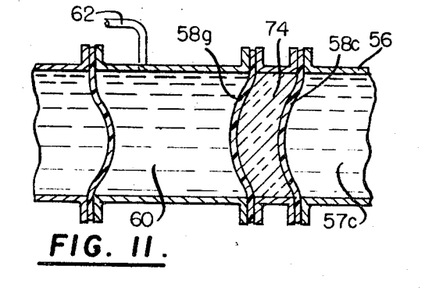
FIG. 11 is a fragmentary cross-sectional representation of a distillate receiver capable of displacing distilland into a distillation zone.

Another embodiment of my invention is shown in FIG. 11 which may be a portion of a vessel 56 of the type shown in more detail in FIG. 10. Instead of having like or unlike liquids on opposite sides of a flexible membrane, I insert open-cell polyurethane insulation 74 in sheet or particulated form, or some other flexible form of insulation such as glass wool, between two membranes 58c and 58g. Shown on one side of membrane 58c is distillate 57c which is under a head pressure which displaces membranes 58c and 58g, and the flexible insulation 74, to transfer pressure onto distilland 60 on one side of flexible membrane 58g. The distilland 60 is thereby displaced through outlet assembly 62 to a distillation zone (not shown). It is understood that such insulation generally depends upon a fluid, such as air, being within the cells or being between the fibers and therefore such insulation includes a form of fluid in this embodiment. Any insulating material may be interposed between distillate and distilland in my invention as long as it does not interfere with the displacement of distilland 60 into a distillation zone as a result of collecting distillate on one side of a displaceable membrane or wall.

Figure 12:
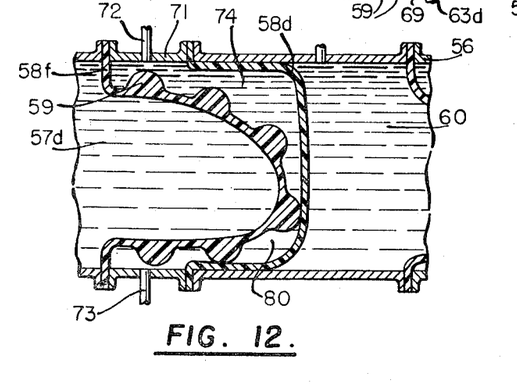
FIG. 12 is a fragmentary cross-sectional representation of the distillation apparatus of FIG. 10 in which a compartment with flexible walls containing a fluid other than distillate is interposed between a compartment receiving distillate and one containing distilland to be displaced into a distillation zone.

FIG. 12 shows a fragment of a vessel, such as 56 of FIG. 10 with like numbers used to indicate like parts, illustrating another embodiment of my invention described only in points of difference from earlier embodiments. Between the compartment for distillate 57d and the compartment for distilland 60 is interposed a compartment partially formed by spacer 71f, containing a fluid 74 shown in FIG. 12 as a liquid which may be filled, drained, or circulated (by means not shown) through pipe connections 72 and 73. In another form, fluid 74 may be a gas under pressure generally not exceeding that exerted by distillate 57d or by other liquids in vessel 56. The displaceable membrane 58f is shown with domed projections 59 of greater thickness and rigidity than intermediate portions; membrane 58f may be shaped in this manner by thermoforming, casting, or by other means.

The purpose of projections 59, of FIG. 12, which may be other than dome-shaped, is to prevent membrane 58f from coming into close contact with membrane 58d over large contiguous areas, and thereby to maintain spaces 80 for a substantial volume of fluid 74 between said membranes. When fluid 74 is a liquid, as shown in FIG. 12, the liquid fluid 74 can be heated by an external heater (not shown) and circulated through the compartment partially formed by membranes 58d and 58f for the purpose of preheating distilland 60 before it is discharged by pressure from collected distillate. When fluid 74 is a gas, such as air, it is interposed between membranes 58d and 58f to provide thermal insulation which retards heat transfer between distilland 60 and any distillate fraction, such as 57d. Such thermal insulation is important when distilland 60 in vessel 56 is at a temperature high enough to cause undesirable volatilization of the distillate.

In another embodiment of my invention, I use two or more contiguous flexible membranes where a single flexible membrane is shown in FIGS. 8 to 12. The purpose of a plurality of membranes in contiguous relationship is to provide a reserve membrane in case one fails or has a pinhole leak; another purpose is to provide two or more unlike membranes suited to resist different chemical actions of the distilland and of the distillate, owing to some substance removed from or added to the distillate or distilland for purposes not pertinent to this invention and when a single flexible membrane resistant to both the distillate and the distilland is not available.

In the operation of my invention described with reference to FIGS. 9, 10, 11, and 12, the collection of one or more distillate fractions is caused to displace at least one rigid wall of one or more distillate receivers, or to displace a plurality of flexible walls of one or more distillate receivers, in a manner to displace distilland from a distilland reservoir into a distillation zone. Also, for the operation of my invention, means are described to preheat distilland which is confined within the vessel from which it is to be discharged into the distillation zone of a still by a displaceable wall displaced by distillate collected from the still distilling distilland previously displaced by distillate. Moreover, means are described for interposing an insulating fluid, or an insulating material, between distillate collected in a vessel and distilland to be discharged therefrom into a distillation zone by one or more fractions of collected distillate.

The form and size of the vessels and compartments containing distillate and distilland for purposes of this invention are immaterial as is the means for heating the distilland to cause distillation. The process may be carried out with various embodiments of the apparatuses here illustrated in FIGS. 1 to 12, or in other embodiments or combinations thereof which may include a plurality of distilland reservoirs with a single or a plurality of distillate reservoirs in a single vessel or in contiguous vessels operating jointly to produce the effects characteristic of my invention. It is, moreover, specifically understood that distilling column or fractionating tower such as 54a of FIG. 8 is a portion of the distillation zone of the distillation process into which the distilland is fed by my invention. Supplementary or intermediate means for processing or transferring distilland may likewise be interposed between the distillation zone and the distilland reservoir of my invention which need only perform a part of the function of transferring distilland to the distillation zone by displacement caused by collected distillate.

The invention is not limited to the embodiments illustrated and described since the essence of the disclosed invention is capable of receiving a variety of expressions which will readily suggest themselves to those skilled in the art. I do not wish, therefore to be limited to the precise details of construction and operation set forth, but desire to avail myself of all aspects within the scope of the appended claims.

What is claimed is:

1. A process for the distillation of distilland displaced into a distillation zone from a distilland reservoir having one or more movable walls by distillate collected in the distillate reservoir, the process comprising distilling the displaced distilland to vapors in a distillation zone, condensing the vapors to distillate at a level higher than the distillate reservoir, transferring by gravity said distillate to said distillate reservoir whereupon the hydraulic force formed by the head pressure of distillate in said distillate reservoir displaced one or more of the movable walls of the distillate reservoir and transfers said hydraulic force to the distilland in the distilland reservoir, which distilland is separated from the distillate by the movable wall, and displaces said movable wall by said head pressure of distillate to thereby cause the displacement of at least a portion of said distilland in said distilland reservoir and to discharge by gravity the displaced distilland through an opening in the distilland reservoir and leading into said distillation zone.

2. An apparatus for the distillation of distilland displaced by distillate comprising means for collection of distillate from, and for feeding distilland into, a distillation assembly which includes a heating means, a distillation vessel, a vapor-condensing means, and:

(a) at least one distilland reservoir having a movable distilland-confining wall surface and an outlet means in said distilland reservoir adapted for gravity transfer of distilland displaced within said distilland reservoir to said distillation vessel, and (b) at least one distillate reservoir which confines distillate delivered by gravity from said vapor-condensing means, said distillate reservoir having a movable distillate-confining wall surface which is displaced by the hydraulic force of distillate in said distillate reservoir and which transfers said force by wall-surface interconnecting means to said movable distilland-confining wall surface of said distilland reservoir and which enables said distillate confined in said distillate receiver to transfer force upon said distilland thereby displacing by gravity flow at least a portion of said distilland from said distilland reservoir through said outlet means into said distillation vessel.

3. The apparatus of claim 2 in which the means for causing said distillate to transfer force upon said distilland comprises at least in part of at least one displaceable flexible membrane interposed between said distillate and said distilland.

4. The apparatus of claim 2 in which the means for causing said distillate to transfer force upon said distilland comprises at least in part of at least one rigid wall interposed between said distillate and said distilland, said rigid wall floating upon a fluid.

5. The apparatus of claim 2 in which means are provided for interposing fluid other than distillate between said distillate and said distilland in a manner causing said fluid to be subjected to the hydraulic force of said distillate and to transfer the force of distillate to said distilland to caues displacement of at least a portion of said distilland into said distillation vessel.

6. The apparatus of claim 2 in which thermal barrier means are interposed between said distillate and said distilland to reduce thermal exchange between said distillate and said distilland without affecting the displacement of said distilland by said distillate.

7. The apparatus of claim 2 in which means are provided to preheat distilland to a temperature lower than that of the boiling point of said distilland and of said distillate by interposing a heated fluid between said distilland and said distillate.

8. The apparatus of claim 2 in which a plurality of contiguous flexible walls are disposed to act in unison to transfer hydraulic force from said distillate to said distilland in a manner causing said distilland to be displaced into a distillation vessel.

9. The apparatus of claim 2 in which there are a plurality of distillate reservoirs adapted to confine at least one boiling-point fraction of distillate which are associated with a plurality of means comprising portions of displaceable walls interposed between said distillate and said distilland which is displaceable from said distilland reservoir into said distillation vessel.

10. The apparatus of claim 9 in which means are provided for interposing a fluid other than distillate between at least one of said plurality of distillate reservoirs and said distilland in a manner enabling said fluid subjected to hydraulic force created by said distillate to transfer said hydraulic force of distillate to said distilland thereby enabling it to displace at least a portion of said distilland into said distillation vessel.

11. An apparatus for solar distillation comprising:
(a) at least one still having a bottom section and containing distilland in a distilland reservoir in a distillation zone,
(b) means for introducing distilland into said distilland reservoir and for removing an excess of distilland,
(c) at least one cover section of material transparent to solar radiation overlying the distillatiton zone,
(d) at least the major portion of said cover section spaced away from said still bottom by at least one support member to form said distillation zone,
(e) at least one enclosed distillate collection reservoir formed with at least one wall being a flexible water impervious member disposed along the bottom section and underlying the distilland and with means for withdrawing distillate from said distillate collection reservoir,
(f) at least one of said distillate collection reservoirs being connected with a higher level distillate collecting through associated with the cover section to collect distillate therefrom,
(g) said distilland reservoir opening into the next lower distillation zone,
(h) said flexible water impervious member being movable from one position to another under hydrostatic pressure so as to thereby vary the ratio of the volumes of the distillate and distilland in the two adjacent reservoirs and to displace said distilland through the said opening and into said next lower distillation zone.

12. An apparatus for solar distillation comprising:
(a) at least one still having a bottom and containing distilland in a distilland reservoir in a distillation zone,
(b) means for introducing distilland into said distilland reservoir and for removing an excess of distilland,
(c) at least one multiangular cover of material transparent to solar radiation overlying the distillation zone,
(d) at least the major portion of said multiangular cover spaced away from said still bottom by at least one supporting member to form said distillation zone,
(e) at least one enclosed distillate collection reservoir formed with at least one wall being a flexible water imprevious member disposed along the bottom and underlying the distilland and with means for withdrawing distillate from said distillate collection reservoir,
(f) at least one of said distillate collection reservoirs being connected with a higher level distillate collecting trough associated with the multiangular cover to collect distillate therefrom,
(g) said distilland reservoir opening into the next lower distillation zone,
(h) said flexible water impervious member being movable from one position to another under hydrostatic pressure so as to thereby vary the ratio of the volumes of the distillate and distilland in the two adjacent reservoirs and to displace said distilland through the said opening and into said next lower distillation zone,
(i) said supporting members including distillate collecting troughs having means for removing distillate from said apparatus,
(j) said supporting members contacting said cover at apexes of its multiangularity.

13. An apparatus for solar distillation comprising:
(a) at least one still having a bottom and containing distilland in a distilland reservoir with an opening leading into a distilland distillation zone,
(b) means for introducing distilland into said distillation zone and into said distilland reservoir, and for removing an excess of distilland,
(c) at least one multiplanar cover section of material transparent to solar radiation and overlying said distillation zone,
(d) at least the major portion of said cover section being spaced away from said still bottom by at least one supporting member elongated in a substantially horizontal plane contacting said cover to form said distillation zone and to cause said cover to assume a multiplanar shape,
(e) at least one enclosed distillate collection reservoir connected with a higher level elongated distillate collecting trough associated with the elongated supporting member and the multiplanar cover to collect distillate from a major portion of said cover,
(f) said distillate collection reservoir being formed with at least one wall being a flexible water impervious member disposed adjacent said distilland reservoir and with means for withdrawing distillate from said distillate collection reservoir,
(g) said flexible water impervious member being movable from one position to another under hydrostatic pressure so as to thereby vary the ratio of the volumes of the distillate and distilland in the two adjacent reservoirs and to displace said distilland through said opening and into a distlilation zone.

14. An apparatus for solar distillation comprising:
(a) at least one still containing a distilland distillation zone over a still bottom and a distilland reservoir,
(b) means for introducing distilland into said distilland distillation zone and into said distilland reservoir, and for removing an excess of distilland,
(c) at least one cover section of material transparent to solar radiation overlying said distilland distillation zone,
(d) at least the major portion of said cover section being spaced away from said still bottom by at least one cover supporting member associated with a distillate collecting trough and able to collect distillate from said cover,
(e) means connecting said distillate collecting trough with a distillate reservoir having means for withdrawal of distillate and said distillate reservoir having a flexible water impervious member disposed adjacent said distilland reservoir,
(f) said flexible member being movable from a first position to a second position under hydrostatic pressure so as to thereby vary the ratio of the volumes of the distillate and distilland in the two adajcent reservoirs and to displace said distilland from a first position other than within said distilland distillation zone to a second position within said distilland distillaton zone.

15. An apparatus for solar distillation comprising:
(a) at least one still having a bottom section with means for introducing distilland and for removing an excess thereof,
(b) at least one cover section of material transparent to solar radiation and overlying said bottom section,
(c) at least a major portion of said cover being internally supported intermediate the still perimeter by at least one elongated cover support having line contact with said cover section and having a stem inclined at an angle to said bottom section said stem including a condensate collecting trough, and
(d) adjustable means within said solar still and operatively connected to the stem of said cover support for periodically varying said angle formed by the internal cover support and said still bottom to permit said stem of said cover support to be adjusted substantially parallel to solar rays passing through said cover.

16. An apparatus for solar distillation comprising a solor still having:
(a) at least one still bottom with emans for introducing distilland,
(b) at least one cover section of flexible material transparent to solar radiation said cover section overlying distilland on said still bottom,
(c) at least the major portion of said cover section spaced away from said still bottom by at least one elongated cover-supporting member intermediate the still perimeter in a substantially horizontal direction contacting said cover in line contact so as to cause said cover to assume a multiplanar shape overlying said distilland on said still bottom and so as to cause condensate to be removed from at least a portion of said cover section, and
(d) an elongated condensate collection trough receiving condensate removed from said cover section by said cover-supporting member intermediate the still perimeter and located below each apex of cover multiplanarity formed by said cover-supporting member intermediate the still perimeter and above said distilland and further operably connected to means removing from said solar still the condensate collected therein.

17. An apparatus for solar distillation having:
(a) at least one still having a bottom section with means for introducing distilland onto said bottom section,
(b) at least one sloping cover section of rigid material transparent to solar radiation overlying said distilland and upon which distillate condenses to condensate,
(c) at least a portion of said cover being contacted by an elongated cover-contacting member transversely located within said still intermediate the high and low extremities of the sloping cover for removing condensate from at least a portion of said cover by directing its flow by gravity toward a condensate collecting trough, forming a portion of said intermediate cover-contacting member, for removal from said solar still.

18. The apparatus of claim 17 in which the intermediate elongated cover-contacting member which removes condensate from said cover is forced into contact with said cover by an at least partially confined spring located within said solar still to exert a pressure upon said elongated cover-contacting member to at least partially support said cover and to improve drainage of condensate from said cover.

References Cited
UNITED STATES PATENTS

| | | | |
|---|---|---|---|
| 3,233,779 | 2/1966 | Cornelius | 222—52UX Dig. |
| 1,204,716 | 11/1916 | Thorssell | 203—24 |
| 2,405,877 | 8/1946 | Delano | 202—234 |
| 2,490,659 | 12/1949 | Snyder | 202—205X |
| 2,520,186 | 8/1950 | Von Platen | 203—24X |
| 2,772,543 | 12/1956 | Berry | 62—115 |
| 2,918,219 | 12/1959 | MacCracken | 237—64(202—205) |
| 3,167,488 | 1/1965 | Malek | 202—174 |
| 3,174,915 | 3/1965 | Edlin | 202—234 |
| 3,190,816 | 6/1965 | Adamec | 202—234 |
| 3,314,862 | 4/1967 | Hay | 202—234 |

FOREIGN PATENTS

| | | | |
|---|---|---|---|
| 28,130 | 1907 | Great Britain | 202—234 |

NORMAN YUDKOFF, Primary Examiner

F. E. DRUMMOND, Assistant Examiner

U.S. Cl. X.R.

202—234; 203—89

UNITED STATES PATENT OFFICE
CERTIFICATE OF CORRECTION

Patent No. 3,549,503      Dated December 22, 1970

Inventor(s) Harold R. Hay

It is certified that error appears in the above-identified patent and that said Letters Patent are hereby corrected as shown below:

Column 13, line 14, after "one" insert -- movable --; line 16, after "said" insert -- movable --; line 22, "caues" should read -- cause --; line 74, "through" should read -- trough --. Column 15, line 50, "emans" should read -- means --.

Signed and sealed this 1st day of June 1971.

(SEAL)
Attest:

EDWARD M. FLETCHER, JR.
Attesting Officer

WILLIAM E. SCHUYLER,
Commissioner of Paten